United States Patent
Uchikawa et al.

(10) Patent No.: US 9,594,585 B2
(45) Date of Patent: Mar. 14, 2017

(54) VIRTUAL MACHINE CONTROL METHOD, APPARATUS, AND MEDIUM

(71) Applicant: FUJITSU LIMITED, Kawasaki-shi, Kanagawa (JP)

(72) Inventors: Tomoki Uchikawa, Kawasaki (JP); Noboru Kurumai, Ohta (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 14/637,491

(22) Filed: Mar. 4, 2015

(65) Prior Publication Data

US 2015/0277956 A1    Oct. 1, 2015

(30) Foreign Application Priority Data

Mar. 31, 2014  (JP) .................. 2014-073233

(51) Int. Cl.
 G06F 9/46 (2006.01)
 G06F 9/455 (2006.01)

(52) U.S. Cl.
 CPC .. G06F 9/45558 (2013.01); *G06F 2009/4557* (2013.01); *G06F 2009/45575* (2013.01)

(58) Field of Classification Search
 CPC .................. G06F 9/485; G06F 2009/45575
 See application file for complete search history.

(56) References Cited

U.S. PATENT DOCUMENTS

| | | | |
|---|---|---|---|
| 7,334,228 B2* | 2/2008 | Clohessy | G06F 9/5016 709/203 |
| 2005/0102674 A1 | 5/2005 | Tameshige | |
| 2010/0042723 A1* | 2/2010 | Sundarrajan | G06F 9/505 709/226 |
| 2010/0235835 A1* | 9/2010 | Nishiguchi | G06F 9/485 718/1 |

FOREIGN PATENT DOCUMENTS

| | | |
|---|---|---|
| JP | 2005-141605 | 6/2005 |
| JP | 2008-15958 | 1/2008 |

* cited by examiner

*Primary Examiner* — Camquy Truong
(74) *Attorney, Agent, or Firm* — Staas & Halsey LLP

(57) ABSTRACT

A method includes monitoring a load of a management target system on which a plurality of virtual machines are executed, cancelling an instruction to activate a virtual machine according to the monitored load and a status of the virtual machine for which the instruction to activate the virtual machine is previously given to the system and which is still under the activation process; and issuing an instruction to the system to stop the virtual machine which is still under an activation process according to the monitored load and the status of the virtual machine.

12 Claims, 19 Drawing Sheets

FIG. 5

| INSTANCE ID | STATE | STATE TRANSITION TIME |
|---|---|---|
| ... | ... | ... |

| INSTANCE ID | STATE | STATE TRANSITION TIME |
|---|---|---|
| I 1 | RUNNING STATE | 1 0 : 0 0 : 0 0 |
| I 2 | UNDER STOPPING PROCESS | 1 1 : 0 0 : 0 0 |
| I 3 | UNDER ACTIVATION PROCESS | 1 2 : 1 0 : 0 0 |
| I 4 | UNDER STOPPING PROCESS | 1 2 : 3 0 : 0 0 |

⬇ Ta3(12:40)

| INSTANCE ID | STATE | STATE TRANSITION TIME |
|---|---|---|
| I 1 | RUNNING STATE | 1 1 : 0 0 : 0 0 |
| I 2 | RUNNING STATE | 1 1 : 0 0 : 0 0 |
| I 3 | RUNNING STATE | 1 2 : 3 8 : 0 0 |
| — | — | — |

FIG. 15

| INSTANCE ID | RESPONSE TIME MEASUREMENT STARTING DATE | RESPONSE TIME MEASUREMENT ENDING DATE | AVERAGE RESPONSE TIME |
|---|---|---|---|
| I 1 | 2013/0301 00:01:00 | 2013/03/01 00:01:59 | 100m s |
| I 2 | 2013/0301 00:01:00 | 2013/03/01 00:01:59 | 200m s |
| ... | ... | ... | ... |

FIG. 18

| TIME | T0 | T1 | T2 | T3 |
|---|---|---|---|---|
| ACTUAL MEASUREMENT RESPONSE TIME | 200 | 600 | 300 | 100 |
| NUMBER OF RUNNING INSTANCES | 1 | 1 | 6 | 6 |
| TERM #1 | — | 4 | 1 | −1 |
| TERM #2 | — | 1 | −0.75 | −0.5 |
| NUMBER OF INSTANCES SUBJECTED TO SCALE CONTROL | — | 5 (UNITS) | 0.25→0 (UNITS) | −1.5→2 (UNITS) |

VIRTUAL MACHINE CONTROL METHOD, APPARATUS, AND MEDIUM

CROSS-REFERENCE TO RELATED APPLICATION

This application is based upon and claims the benefit of priority of the prior Japanese Patent Application No. 2014-073233, filed on Mar. 31, 2014, the entire contents of which are incorporated herein by reference.

FIELD

The embodiments discussed herein are related to a method, an apparatus, and a medium.

BACKGROUND

In recent years, cloud services in which computer processing or the like are used via networks using the Internet have been provided.

In cloud environments in which cloud services are provided, a plurality of servers are prepared in large-sized data centers and systems are constructed so that virtual machines, software, data storage areas, and the like are available via networks.

Such systems can have an autoscale function of increasing and decreasing virtual machines. The autoscale function is a function of performing scale-out to add a server to a system and performing scale-in to remove a server from the system according to a processing amount of the system. By performing scale control called the scale-out and scale-in, server resources are set according to a service request.

Japanese Laid-open Patent Publication Nos. 2008-015958 and 2005-141605 are examples of the related art.

SUMMARY

According to an aspect of the invention, a method includes monitoring a load of a management target system on which a plurality of virtual machines are executed, cancelling an instruction to activate a virtual machine according to the monitored load and a status of the virtual machine for which the instruction to activate the virtual machine is previously given to the system and which is still under the activation process; and issuing an instruction to the system to stop the virtual machine which is still under an activation process according to the monitored load and the status of the virtual machine.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an instance information table;

FIG. 11 is a diagram illustrating an instance information table;

FIG. 15 is a diagram illustrating an example of the data structure of response time information DB;

FIG. 18 is a diagram for describing the number-of-instances calculation process.

DESCRIPTION OF EMBODIMENT

First, an examination of the inventors will be described. In cloud environments, users are charged according to an amount of resources that have been used. Therefore, changes in allocation amounts of resources are not typically performed until a situation in which resources are actually used.

On the other hand, there are cases in which proper allocation of resources is desired in response to prediction of future values, e.g., a steep increase in the number of accesses. However, when the resources are actually allocated, charging occurs in spite of the fact that the resources are not used in actual processes.

There is a desire to respond to an increase or decrease in the amount of a request by changing the allocation of the resources according to a sign indicating a change in the request for services. However, when it takes a time to activate a calculator requested for the allocation of the resources, it takes a certain time until the instruction to activate or stop the calculator for the purpose of changing the allocation of resources, which is performed in the past, is carried out as a resource of a service. Further, it is difficult to perform an immediate response for the purpose of relating to charging.

In an embodiment to be described below, it is possible to shorten a period in which virtual machines are deficient or excessive. Hereinafter, an embodiment will be described with reference to the drawings.

In the embodiment, there is provided an information processing apparatus managing the number of virtual machines in an information processing system performing a service using the virtual machine. The information processing apparatus monitors a load of a management target system and gives an instruction to stop a virtual machine which is under an activation process according to a load monitoring result and a status of the virtual machine for which the instruction to activate the virtual machine is previously given to the system and which is under the activation process.

The information processing apparatus performs scale-out or scale-in of a virtual machine according to a change in a load per unit time. At the time of the scale-in, a virtual machine to be stopped is selected based on an activation start time. Thus, it is possible to shorten a period in which the virtual machines are deficient or excessive.

Figure 1:
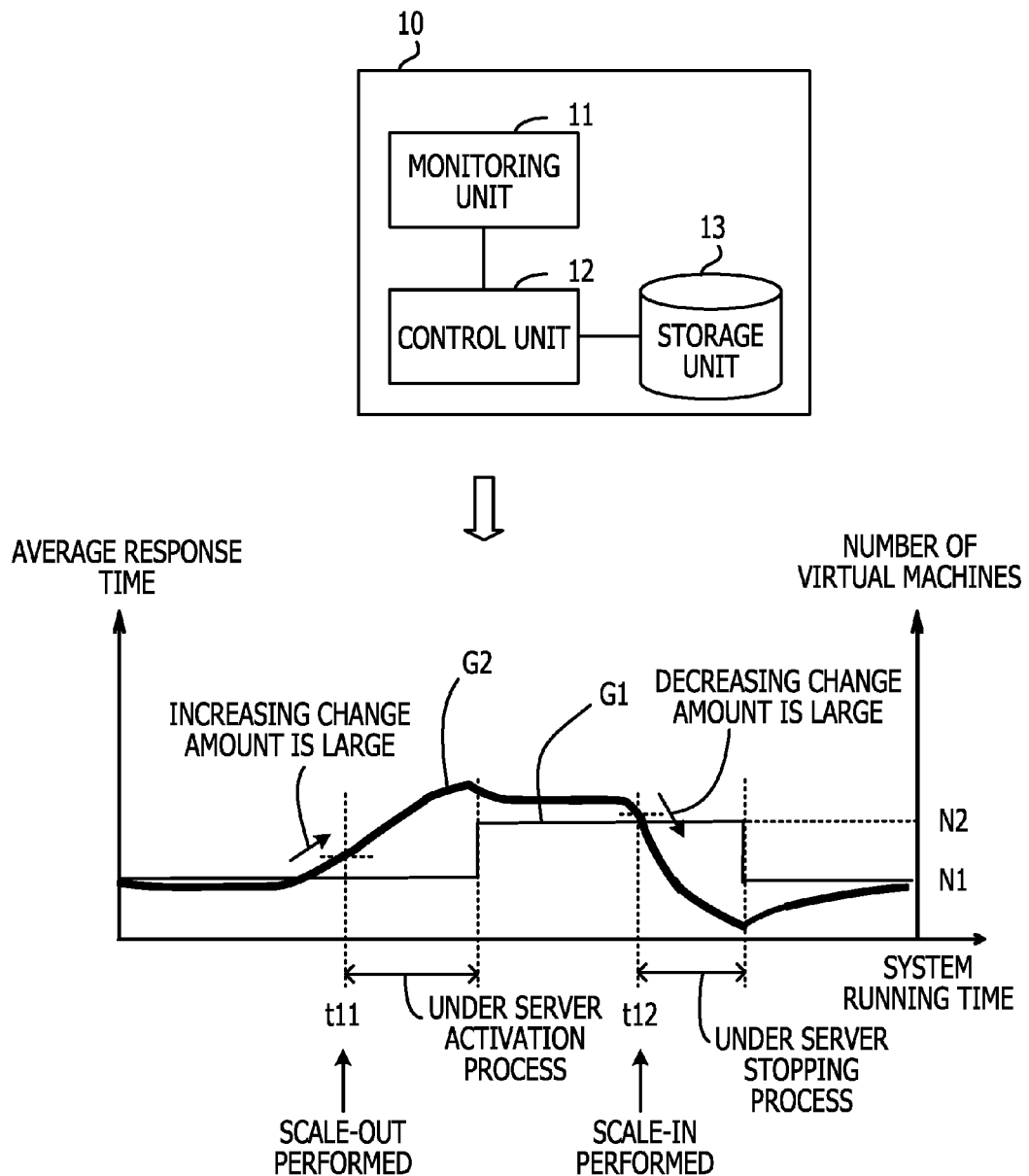
FIG. 1 is a diagram illustrating an example of the configuration of an information processing apparatus.

FIG. 1 is a diagram illustrating an example of the configuration of an information processing apparatus. An information processing apparatus 10 includes a monitoring unit 11, a control unit 12, and a storage unit 13.

The monitoring unit 11 monitors a load of an information processing system. The load is determined based on, for example, a response time or a usage rate of a central processing unit (CPU). The response time is a time which is taken until return of a response when a client makes a service request to the system. When the response time is lengthened, it means that the load is increased. When the response time is shortened, it means that the load is decreased. Hereinafter, the load is assumed to be monitored using the response time. In this case, the monitoring unit 11 recognizes the response time until a virtual machine receives a service request, and then transmits its response.

When a change amount of the load per unit time exceeds a threshold value, the control unit 12 gives a scale-out instruction to newly activate a virtual machine or a scale-in instruction to stop a virtual machine selected based on an activation start time among existing virtual machines. For example, the control unit 12 compares the change amount of the response time to the threshold value. When the change amount of the response time exceeds the threshold value, the control unit 12 performs scale-out to increase the number of virtual machines or performs scale-in to decrease the number of virtual machines. The control unit 12 also manages an operation state of the virtual machine. The storage unit 13 stores information regarding the scale control.

FIG. 1 illustrates the number of virtual machines and transition of the response time. The horizontal axis represents a system running time of a system that provides a cloud service, the left vertical axis represents an average response time, and the right vertical axis represents the number of running virtual machines. A graph G1 (thin solid line) indicates the number of virtual machines and a graph G2 (thick solid line) indicates a response time.

The control unit 12 detects the change amount of the response time. In this case, when an increasing change amount of the response time is recognized to exceed a first threshold value at a time t11, the control unit 12 performs the scale-out and increases the number of running virtual machines from N1 to N2, for example.

When a decreasing change amount of the response time is recognized to exceed a second threshold value at a time t12, the control unit 12 performs the scale-in and decreases the number of running virtual machines from N2 to N1, for example.

Here, in autoscale of the related art, the scale-out is performed when the response time reaches an upper limit. The scale-in is performed when the response time reaches a lower limit. Therefore, for a period of time taken to complete the activation of the virtual machines or to complete the stop of the virtual machines, a deficient state or an excessive state of the virtual machines occurs.

In contrast, the information processing apparatus 10 performs the scale-out and the scale-in according to an increase rate or a decrease rate of the response time. Thus, the scale-out is performed in an earlier stage before the response time reaches the upper limit, and an activation instruction can be given to a scale-out target virtual machine. Therefore, it is possible to suppress the deficient state of the virtual machines. Alternatively, it is possible to shorten a period of time in which the virtual machines are deficient.

The scale-in is performed in an earlier stage before the response time reaches the lower limit, and a stopping instruction can be given to a scale-in target virtual machine. Therefore, it is possible to suppress the excessive state of the virtual machines. Alternatively, it is possible to shorten a period of time in which the virtual machines are excessive. The details of the operations will be described after FIG. 4.

Next, problems to be solved will be described in detail before detailed description of the present technology. First, ideal scale control will be described. Hereinafter, a virtual machine is referred to as an instance.

Figure 2:
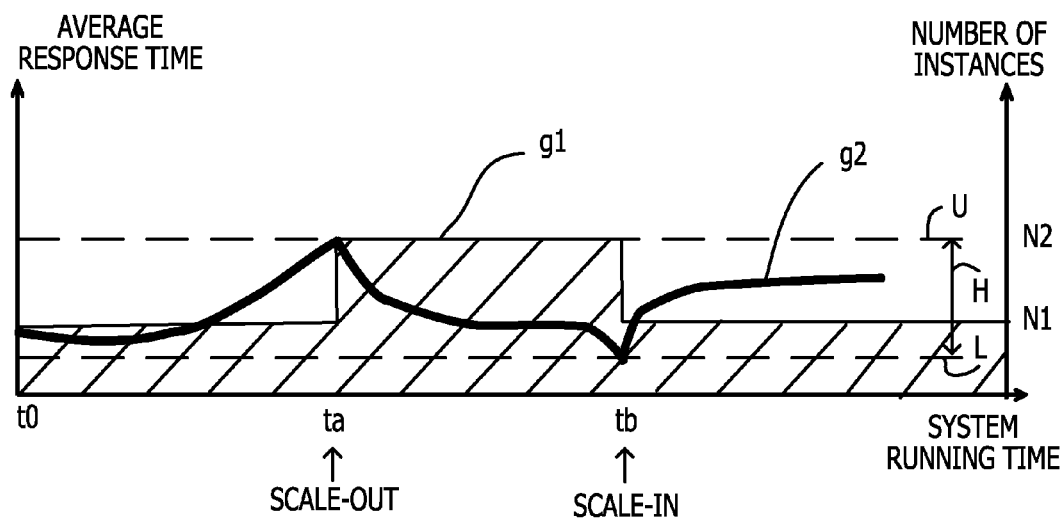
FIG. 2 is a diagram illustrating transition of the number of instances and an average response time.

FIG. 2 is diagram illustrating transition of the number of instances and an average response time. The horizontal axis represents a system running time, the left vertical axis represents an average response time, and the right vertical axis represents the number of running instances. The average response time is a value obtained by dividing a sum of response times of M accesses by M when user's accesses to the system for M service requests are made.

A graph g1 (thin solid line) indicates the number of instances and indicates the number of running instances. A graph g2 (thick solid line) indicates the average response time. A diagonal-line portion (area) of a region surrounded by the graph g1 and the horizontal axis indicates a cost which increases or decreases according to the number of instances.

In the average response time, an allowable range H is set. The allowable range H has a lower limit L which is a lower limit time and an upper limit U which is an upper limit time. The scale control is performed such that the average response time falls from the lower limit L to the upper limit U. Hereinafter, an operation at a time t will be described.

[t0≤t<ta] The number of running instances is equal to N1. In a resource state in which the number of instances is N1, the average response time starts to gradually increase while satisfying the allowable range H.

[t=ta] The number of running instances is equal to N2. The average response time reaches the upper limit U of the allowable range H. For the number of instances in the current state, the processing performance is deficient. Therefore, the scale-out is performed and the number of instances increases from N1 to N2.

[ta<t<tb] The number of running instances is equal to N2. Since the resources increase through the scale-out and the processing performance is boosted, the response speed is quickened and the average response time gradually decreases.

[t=tb] The number of running instances is equal to N1. The average response time reaches the lower limit L of the allowable range H. For the number of instances in the current state, the processing performance is excessive. Therefore, the scale-in is performed and the number of instances decreases from N2 to N1.

[tb<t] The number of running instances is equal to N1. Since the resources decrease through the scale-in and the processing performance is lowered, the response speed is slowed and the average response time gradually increases.

Here, when the number of instances is small, the cost is lowered. However, there is a probability of the average response time exceeding the upper limit. In contrast, when the number of instances is larger, the average response time is shortened. However, the cost is raised and there is a probability of the average response time exceeding the lower limit.

As illustrated in FIG. 2 described above, the scale control of changing the number of instances is performed by performing the scale-out/in so that the average response time satisfies the allowable range H. Thus, necessary and sufficient resources to satisfy a service request can be used at an appropriate cost.

However, the foregoing scale control is performed in an ideal scale control state when a time taken to activate and stop the instances is not considered.

That is, in order to activate a scale-out target instance, it takes a processing time to activate the instance. Further, in order to stop a scale-in target instance, it takes a processing time to stop the instance. However, in the scale control of FIG. 2, such times are not considered.

In actual scale control, an instance activation processing time has influence on the scale-out and an instance stop processing time has influence on the scale-in.

Figure 3:
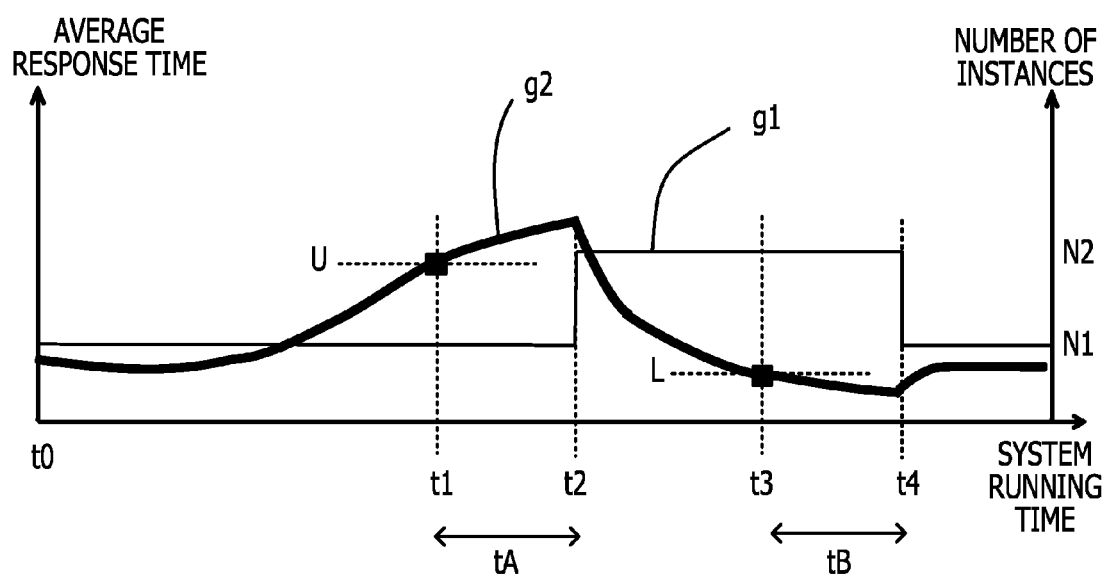
FIG. 3 is a diagram illustrating transition of the number of instances and an average response time.

Next, problems of the scale control of the related art will be described. FIG. 3 is a diagram illustrating transition of the number of instances and an average response time. The horizontal axis represents a system running time, the left vertical axis represents an average response time, and the right vertical axis represents the number of running instances. A graph g1 indicates the number of instances and a graph g2 indicates the average response time.

An area surrounded by the graph g1 and the horizontal axis indicates a cost, as in FIG. 2. However, diagonal lines are not illustrated in the following description to simplify the drawing. Hereinafter, an operation at a time t of the scale control of the related art will be described.

[t0≤t<t1] The number of running instances is equal to N1. In a resource state in which the number of instances is N1, the average response time gradually increases.

[t=t1] The number of running instances is equal to N1. The average response time reaches the upper limit U. At this time, since the scale-out is performed, an instance increased through the scale-out starts an activation process.

[t1<t<t2] The number of running instances is equal to N1. Here, tA is assumed to be a period of time in which the activation process for the instance to be increased through the scale-out is being performed. Since the scale-out is not yet completed in the period of time tA, the average response time continuously increases over the upper limit U.

[t=t2] The number of running instances is equal to N2. The activation of the scale-out target instance is completed, the number of instances is changed from N1 to N2, and the scale-out is thus completed. The increase in the average response time is stopped.

[t2<t<t3] The number of running instances is equal to N2. The scale-out is performed, and thus the number of instances increases from N1 to N2. Thus, the response speed is quickened and the average response time gradually decreases in the resource state in which the number of instances is N2.

[t=t3] The number of running instances is equal to N2. The average response time reaches the lower limit L. At this time, since the scale-in is performed, a stopping process for the instance to be decreased through the scale-in starts.

[t3<t<t4] The number of running instances is equal to N2. Here, tB is assumed to be a period of time in which the stopping process for an instance to be decreased through the scale-in is being performed. Since the scale-in is not yet completed in the period of time tB, the average response time continuously decreases to continuously decrease below the lower limit L.

[t=t4] The number of running instances is equal to N1. The stopping process for the instance is completed, the number of instances is changed from N2 to N1, and the scale-in is thus completed. The decrease in the average response time is stopped.

[t4<t] The number of running instances is equal to N1. In the resource state in which the number of instances is N1, the average response time gradually increases.

Thus, in the scale control of the related art, the scale-out is performed when the average response time reaches the upper limit U. The scale-in is performed when the average response time reaches the lower limit L.

However, when the average response time reaches the upper limit U, the activation of the scale-out target instance is not completed at the time at which the scale-out is performed in spite of the fact that the scale-out is performed. It takes a given activation processing time until the activation is completed.

Therefore, since the instance resources are deficient for a service request in the period of time to from the start of the activation to the completion of the activation, a state in which a processing load is high continues, and thus the processing performance may deteriorate.

Further, when the average response time reaches the lower limit L, the stop of the scale-in target instance is not completed at the time in which the scale-in is performed in spite of the fact that the scale-in is performed. It takes a given stop processing time until the stop is completed.

Therefore, even when the service request is satisfied in the period of time tB from the start of the stop to the completion of the stop, the instance resources are excessive. Therefore, an unnecessary cost occurs.

Thus, in the related art, the upper/lower limit of the average response time is provided, the average response time is compared to the upper/lower limit, and the scale-out/in is performed. Therefore, the deficient state of the resources continues and the processing performance may deteriorate, or the excessive state of the resources continues and an unnecessary cost may occur.

The present technology is devised in view of the above-mentioned circumstances and is designed to realize efficient scale control so that the deficient/excessive state of the instance resources is suppressed and a cost is suppressed while a service request is satisfied.

Figure 4:
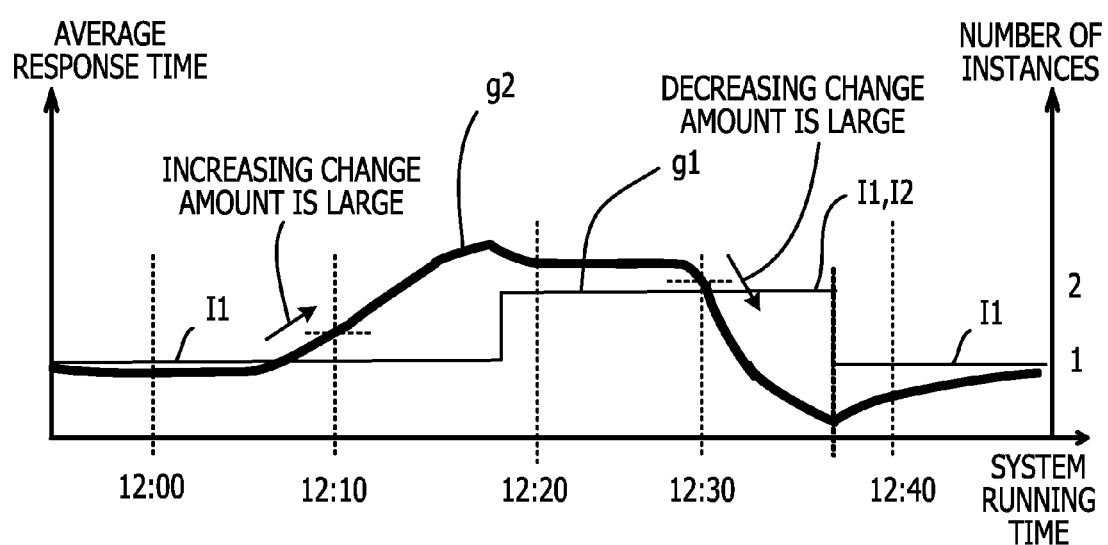
FIG. 4 is a diagram illustrating transition of the number of instances and an average response time.

Next, the scale control according to the present technology will be described in detail below. FIG. 4 is a diagram illustrating transition of the number of instances and the average response time. The horizontal axis represents a system running time, the left vertical axis represents an average response time, and the right vertical axis represents the number of running instances. A graph g1 indicates the number of instances and a graph g2 indicates the average response time.

FIG. 5 is a diagram illustrating an instance information table. An instance information table Ta has fields, an "instance ID (identification)", a "state", and a "state transition time", as instance information.

Figure 6:
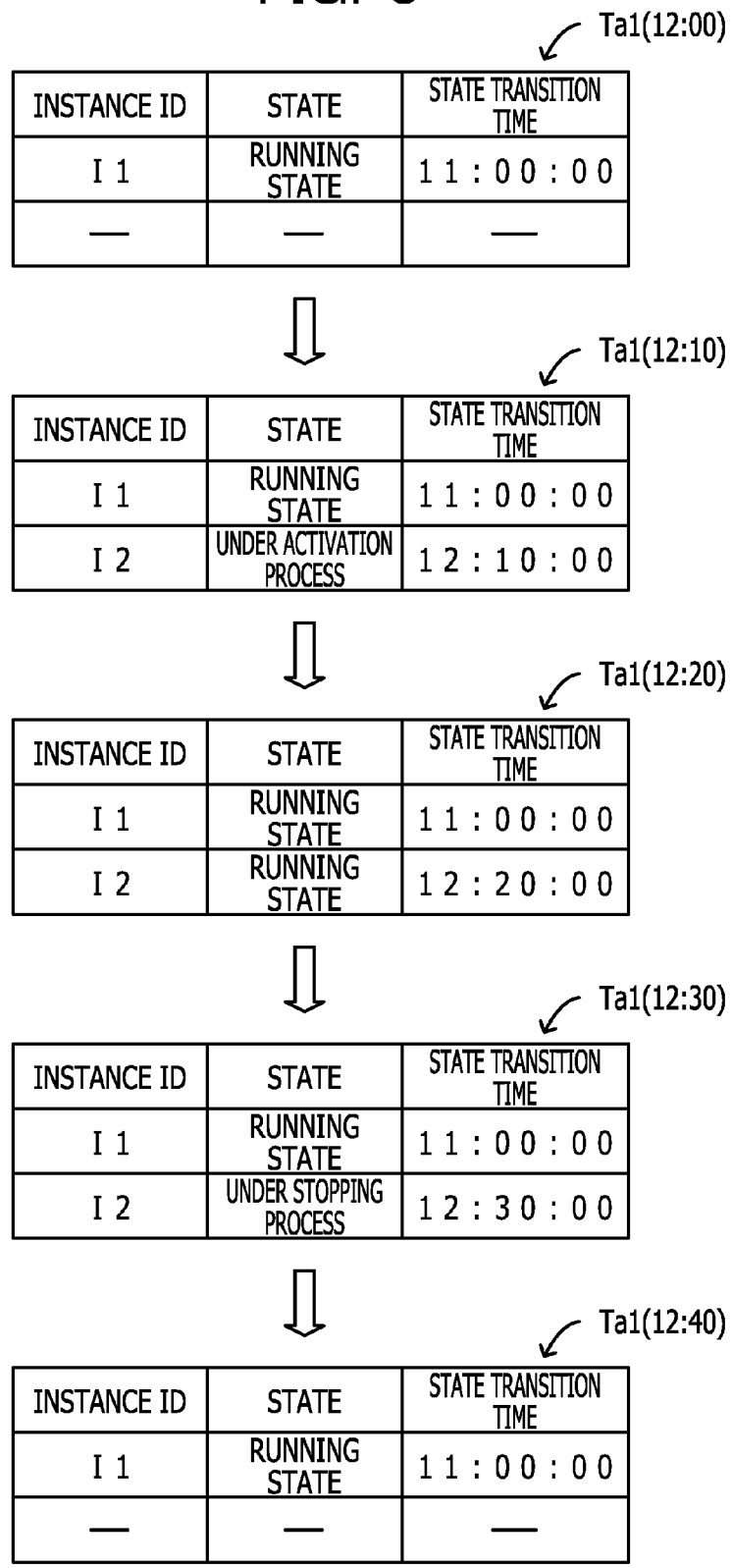
FIG. 6 is a diagram illustrating an instance information table.

The "instance ID" is an identification number of an instance. The "state" indicates an operation state of an instance. The "state transition time" indicates a time (which may include a year, a month, and a date) when an operation state of an instance transitions. FIG. 6 illustrates the instance information at each time of the horizontal axis of FIG. 4. Hereinafter, an operation at each time of FIG. 4 will be described.

[time 12:00] The number of running instances is 1 and an instance I1 with the "instance ID=I1." is running. The activation of the instance I1 is assumed to be completed at time 11:00:00 and the instance I1 is assumed to be currently running.

In this case, as a table generation process, the control unit 12 generates an instance information table Ta1 (12:00) in which the "instance ID=I1", a "state=running state", and a "state transition time=11:00:00" are registered.

[time 12:10] The number of running instances is 1 and the instance I1 is running. It is assumed that the average response time increases and the increasing change amount (a slope of the increase degree) exceeds a first threshold value (referred to as a threshold value th1).

At this time, since the control unit 12 performs the scale-out, the control unit 12 activates the instance to be increased through the scale-out. It is assumed that an "ID=I2" of the activated instance is set and an activation starting instruction time is 12:10:00.

As a table generation process, the control unit 12 generates the instance information table Ta1 (12:10) in which a record including the "instance ID=I2", a "state=under the activation process", and a "state transition time=12:10:00" is registered.

[time 12:20] The number of running instances is 2 and the instances I1 and I2 are running. The activation of the instance I2 is completed at a time 12:20:00 and the instance I2 is running.

As a table generation process, the control unit 12 generates the instance information table Ta1 (12:20) in which the "state" of the record of the "instance ID=I2" is changed to a running state and the "state transition time" is changed to 12:20:00.

[time 12:30] The number of instances running is 2 and the instances I1 and I2 are running. It is assumed that the average response time decreases and the decreasing change amount (a slope of the decrease degree) exceeds a second threshold value (referred to as a threshold value th2).

At this time, the control unit 12 performs the scale-in, an instance to be decreased through the scale-in is stopped. An "ID=I2" of the stopped instance is assumed to be set and a stop starting instruction time is assumed to be 12:30:00.

As a table generation process, the control unit 12 generates the instance information table Ta1 (12:30) in which the "state" of the record of the "instance ID=I2" is changed to a state under the stopping process and the "state transition time" is changed to 12:30:00.

[time 12:40] The number of instances running is 1, the instance I1 is running, and the running of the instance I2 is stopped.

When the control unit 12 recognizes that the stop of the instance I2 is completed, the control unit 12 generates the instance information table Ta1 (12:40) from which the record of the "instance ID=I2" is deleted as a table generation process.

As described above, in the scale control according to the present technology, the scale-out is performed when the increasing change amount of the average response time exceeds the threshold value th1 of the increasing change amount. Thus, it is possible to forecast a time taken from the start of the activation to the completion of the activation of the instance and give an activation starting instruction to the scale-out target instance.

Therefore, even before the average response time exceeds the upper limit or even when the average response time exceeds the upper limit, it is possible to perform the scale-out, while minimizing a period of time at which the average response time exceeds the upper limit. Accordingly, it is possible to reduce a period of time in which the instance resources are deficient and suppress deterioration in the processing performance.

In the scale control according to the present technology, the scale-in is performed when the decreasing change amount of the average response time is less than the threshold value th2. Thus, it is possible to forecast a time taken from the start of the stop and the completion of the stop of the instance and give a stop starting instruction to the scale-in target instance.

Therefore, even before the average response time is less than the lower limit or even when the average response time is less than the lower limit, it is possible to perform the scale-in, while minimizing a period of time in which the average response time is less than the lower limit. Accordingly, it is possible to reduce a period of time in which the instance resources are excessive and suppress unnecessary occurrence of a cost.

Figure 17:
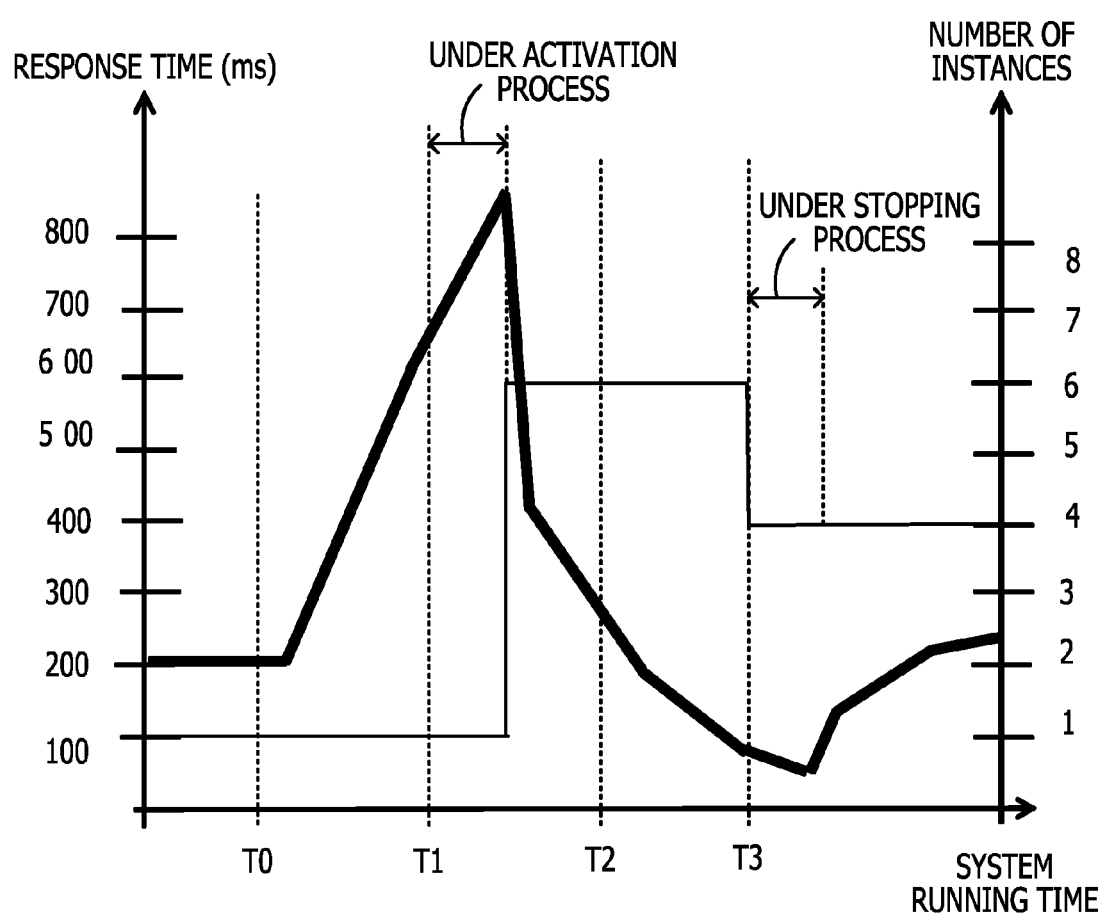
FIG. 17 is a diagram for describing a number-of-instances calculation process.

When the scale-out/in is performed, a number-of-instances calculation process of calculating how many instances are increased or decreased will be described with reference to FIGS. 17 and 18.

Here, in the present technology, as described above, the activation process for the scale-out target instance starts when it is recognized that the increasing change amount of the average response time exceeds the threshold value th1.

At this time, after the activation process for the instance starts, for example, the increase in the change amount of the average response time is lessened for a short time, and thus there is a probability of the resources of the instances starting to be activated being excessive.

Even in this case, in the present technology, when the decreasing change amount of the average response time exceeds a predetermined value, the stopping process for the instance is performed, and thus the excessive state of the resources is dissolved quickly.

Figure 7:
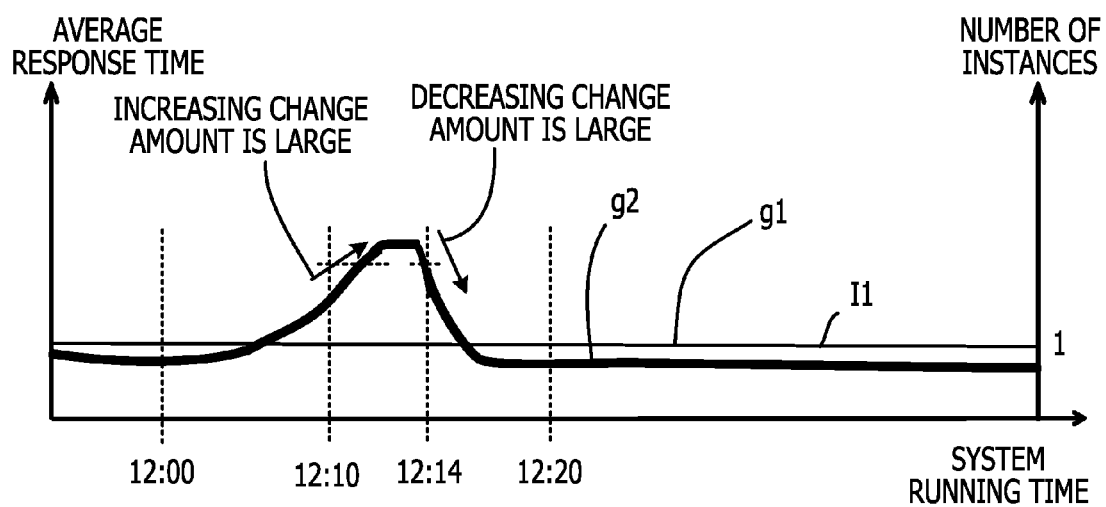
FIG. 7 is a diagram illustrating transition of the number of instances and an average response time.
Figure 8:
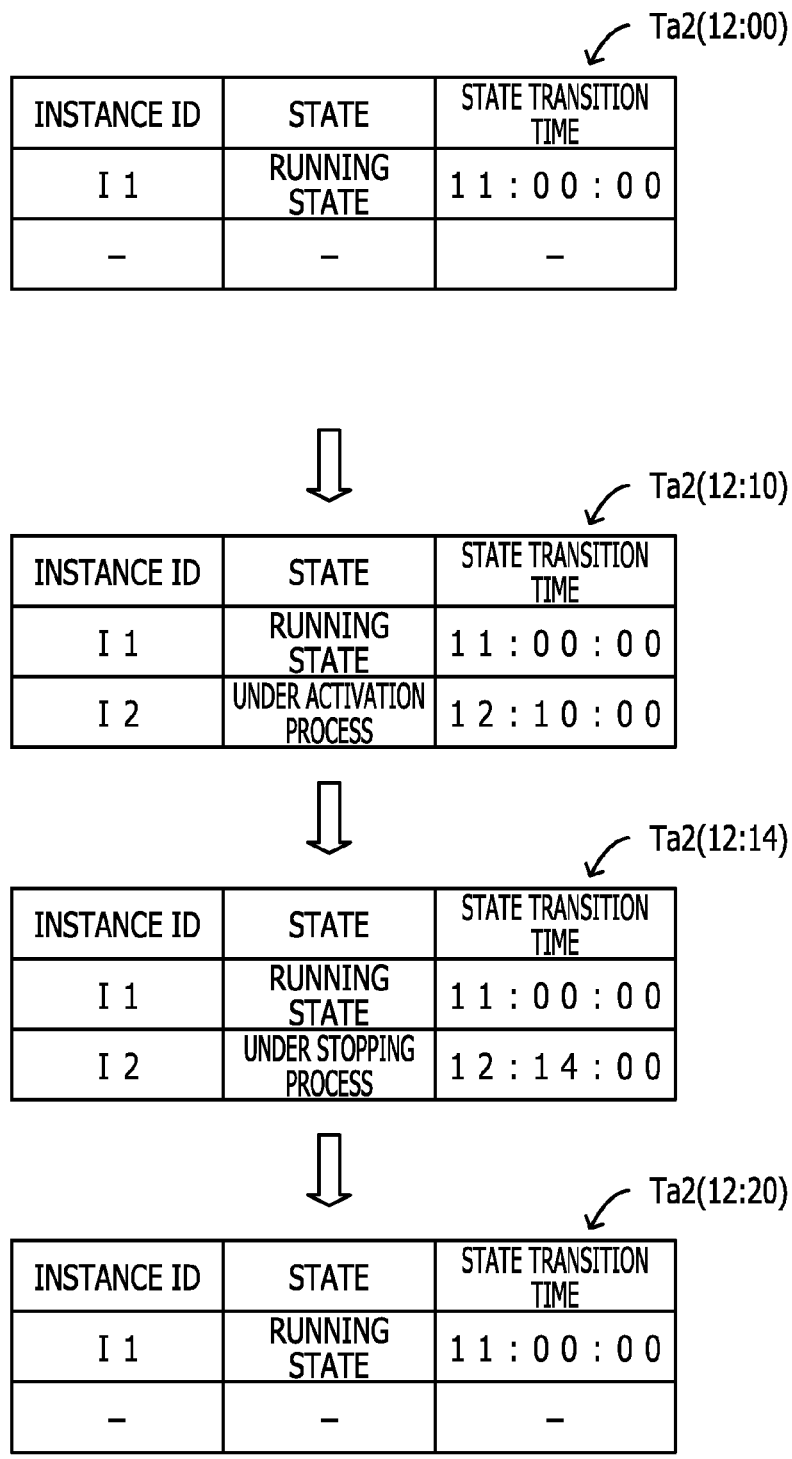
FIG. 8 is a diagram illustrating an instance information table.

FIGS. 7 and 8 are diagrams for describing such a state. FIG. 7 is a diagram illustrating transition of the number of instances and the average response time. The horizontal axis represents a system running time, the left vertical axis represents an average response time, and the right vertical axis represents the number of running instances. A graph g1 indicates the number of instances and a graph g2 indicates the average response time.

FIG. 8 is a diagram illustrating an instance information table. Instance information at each time of the horizontal axis of FIG. 7 is illustrated. Hereinafter, an operation at each time of FIG. 7 will be described.

[time 12:00] The number of running instances is 1 and the instance with the "instance ID=I1" is running. The activation of the instance I1 is assumed to be completed at time 11:00:00 and the instance I1 is assumed to be currently running.

As a table generation process, the control unit 12 generates an instance information table Ta2 (12:00) in which the "instance ID=I1.", a "state=running state", and a "state transition time=11:00:00" are registered.

[time 12:10] The number of instances running is 1 and the instance I1 is running. It is assumed that the average response time increases and the increasing change amount exceeds the threshold value th1. At this time, since the control unit 12 performs the scale-out, the control unit 12 activates the instance to be increased through the scale-out. It is assumed that the "ID=I2" of the activated instance is set and an activation starting instruction time is 12:10:00.

As a table generation process, the control unit 12 generates the instance information table Ta2 (12:10) in which a record including the "instance ID=I2", the "state=under the activation process", and a "state transition time=12:10:00" is registered.

[time 12:14] The number of running instances is 1 and the instance I1 is running. It is assumed that the control unit 12 gives an instruction to activate the instance I2 to perform the scale-out, but the slope of the increase in the average response time is recognized to decrease before completion of the activation of the instance I2.

That is, it is assumed that the decreasing change amount of the average response time exceeds the threshold value th2 before the completion of the activation of the instance I2.

In this case, the control unit 12 gives a stopping instruction to the instance I2 to which the activation instruction has been given once. The instance I2 receiving the stopping instruction performs the stopping process.

As a table generation process, the control unit 12 generates the instance information table Ta2 (12:14) in which the "state" of the record of the "instance ID=I2" is changed to a state under the stopping process and the "time" is changed to 12:14:00.

[time 12:20] The number of running instances is 1 and the instance I1 is running. It is assumed that the running of the instance I2 is stopped and the control unit 12 recognizes that the stop of the instance I2 is completed at the time 12:20:00.

As a table generation process, the control unit 12 generates the instance information table Tat (12:20) from which the record of the "instance ID=I2" is deleted.

As described above, even when the scale-out target instance for which the activation process starts is an excessive resource, the stopping process for the instance is performed based on the decreasing change amount of the average response time. Therefore, it is possible to dissolve the excessive state of the resources quickly.

When the instance of which the activation is already completed is stopped in spite of the fact that the instance under the activation process is present, the process performed with the instance may be stopped. Therefore, at the time of the stopping process, the stopping process is performed from the instance under the activation process.

Figure 9:
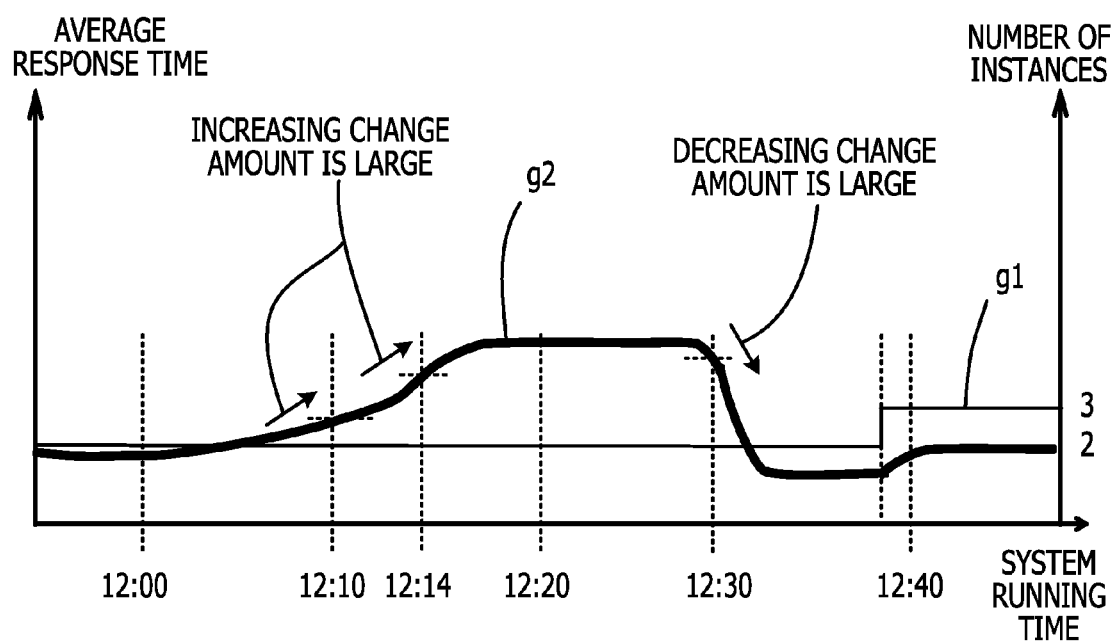
FIG. 9 is a diagram illustrating transition of the number of instances and an average response time.

Next, an instance to which a stopping instruction is given among the instance resources will be described with reference to FIGS. 9 to 11. FIG. 9 is a diagram illustrating transition of the number of instances and the average response time. The horizontal axis represents a system running time, the left vertical axis represents an average response time, and the right vertical axis represents the number of running instances. A graph g1 indicates the number of instances and a graph g2 indicates the average response time.

Figure 10:
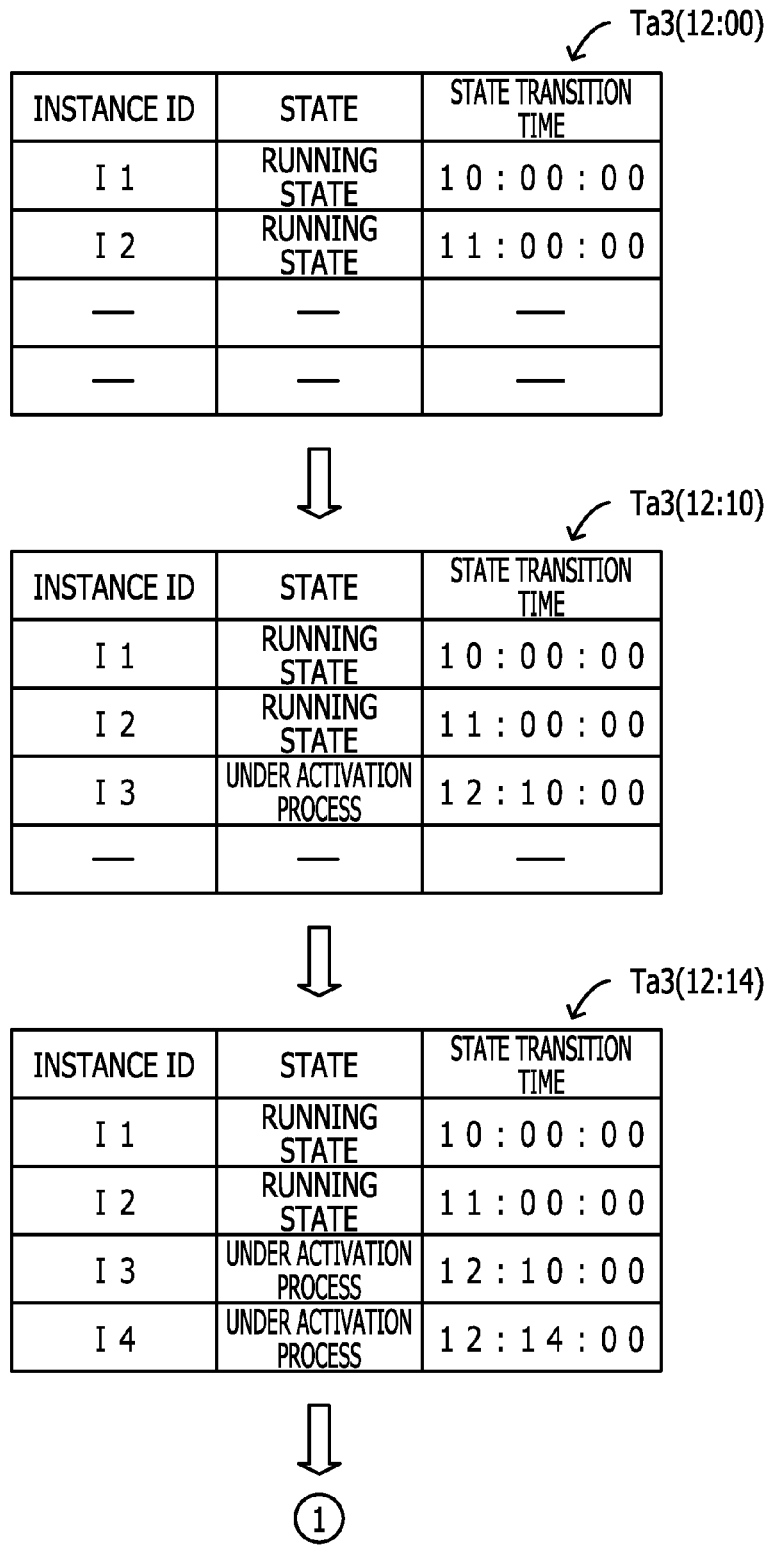
FIG. 10 is a diagram illustrating an instance information table.

FIGS. 10 and 11 are diagrams illustrating an instance information table. Instance information at each time of the horizontal axis of FIG. 9 is illustrated. Hereinafter, an operation at each time of FIG. 9 will be described.

[time 12:00] The number of running instances is 2 and the instance I1 with the "instance ID=I1" and the instance I2 with the "instance ID=I2" are running.

The activation of the instance I1 is completed at the time 10:00:00 and the instance I1 is currently running. The activation of the instance I2 is completed at the time 11:00:00 and the instance I2 is currently running.

As a table generation process, the control unit 12 generates the instance information table Ta3 (12:00) which has a record including the "instance ID=I1", the "state=running state", and the "state transition time=10:00:00" and a record including the "instance ID=I2", the "state=running state", and the "state transition time=11:00:00"

[time 12:10] The number of running instances is 2 and the instances I1 and I2 are running. It is assumed that the average response time increases and the increasing change amount exceeds the threshold value th1.

At this time, since the control unit 12 performs the scale-out, the control unit 12 activates the instance to be increased through the scale-out. It is assumed that an "ID=I3" of the activated instance is set and an activation starting instruction time is 12:10:00.

As a table generation process, the control unit 12 generates the instance information table Ta3 (12:10) in which a record including the "instance ID=I3", a "state=under the activation process", and a "state transition time=12:10:00" is newly registered.

[time 12:14] The number of running instances is 2 and the instances I1 and I2 are running. At the time 12:14, the increasing change amount is assumed to exceed the threshold value th2 again.

At this time, since the control unit 12 performs the scale-out to increase the instance, the control unit 12 activates the instance to be increased through the scale-out. It is assumed that an "ID=I4" of the activated instance is set and an activation starting instruction time is 12:14:00.

As a table generation process, the control unit 12 generates the instance information table Ta3 (12:14) in which a record including the "instance ID=I4", a "state=under the activation process", and a "state transition time=12:14:00" is newly registered.

[time 12:20] The number of running instances is 2 and the instances I1 and I2 are running. The instances I3 and I4 are under the activation process.

[time 12:30] The number of instances running is 2 and the instances I1 and I2 are running. The instances I3 and I4 are under the activation process. It is assumed that the average response time decreases and the decreasing change amount exceeds the threshold value th2. At this time, since the control unit 12 performs the scale-in, the control unit 12 stops the instance to be decreased through the scale-in. The instance to be stopped is set to the instance I4 of which an activation starting time is the latest and the stop starting instruction time is set to 12:30:00.

As a table generation process, the control unit 12 generates the instance information table Ta3 (12:30) in which the "state" of the record of the "instance ID=I4" is changed to a state under the stopping process and the "state transition time" is changed to 12:30:00.

[time 12:40] The number of running instances is 3 and the instances I1, I2, and I3 are running. The activation of the instance I3 is assumed to be completed at the time 12:38:00. Further, the stop of the instance I4 is assumed to be completed at the time 12:40:00.

As a table generation process, the control unit 12 generates the instance information table Ta3 (12:40) in which the "state" of the record of the "instance ID=I3" is changed to a running state and the "state transition time" is changed to 12:38:00 and from which the record of the instance "ID=I4" is deleted.

Thus, the instance to which the stopping instruction is given is selected in consideration of an influence on a service. When the instance under the activation process is present, the instance under the activation process is selected.

When the plurality of instances under the activation process are present, the instances are stopped in order from the instance of which the activation starting time is later, i.e., the recently activated instance.

When the virtual machine under the activation process is not present, the instances are stopped in order from the instance of which the running start time is later, i.e., the recently running instance. Thus, when the instances are stopped, occurrence of interruption of the service can be inhibited.

Figure 12:
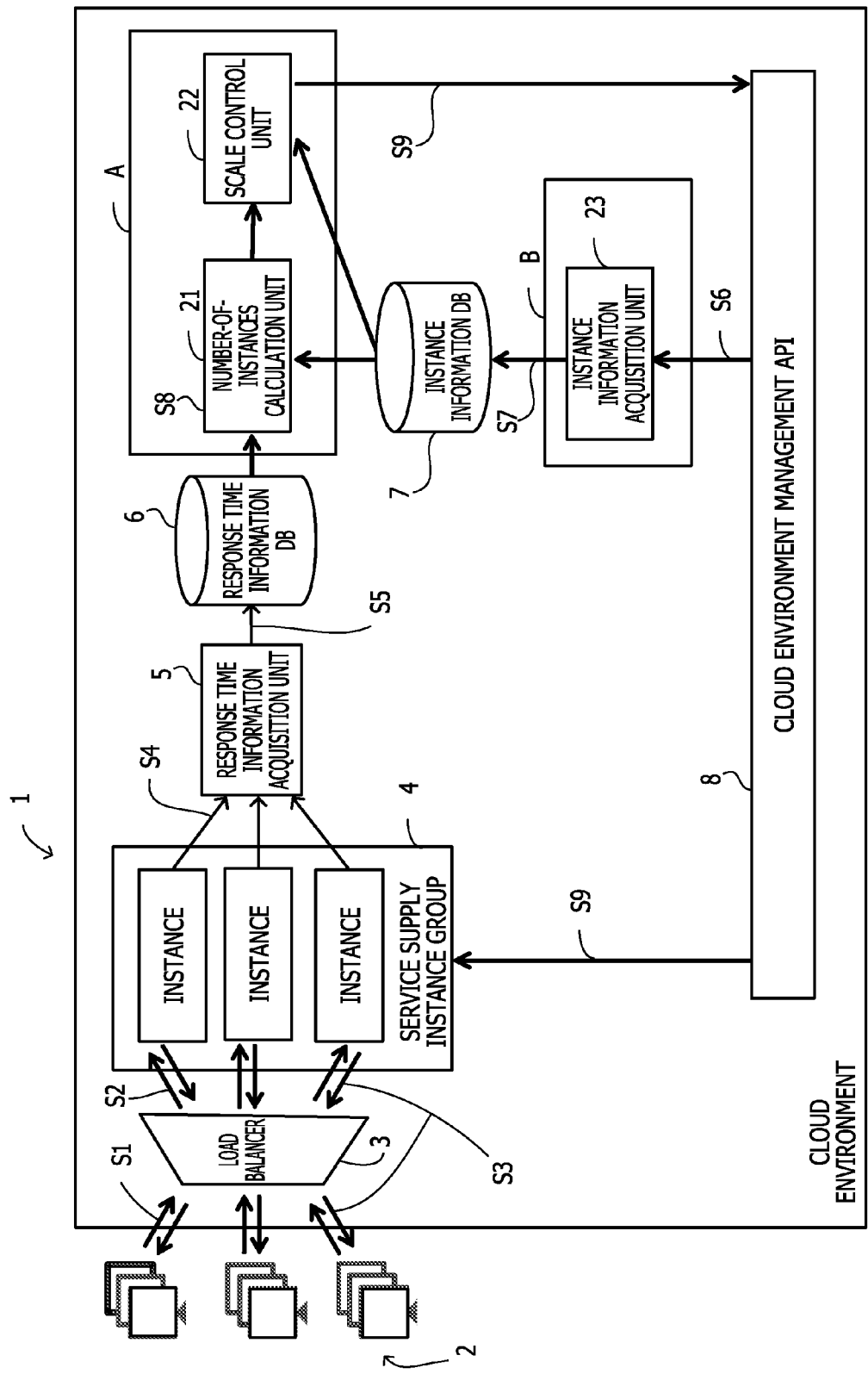
FIG. 12 is a diagram illustrating a flow of a scale control.

Next, a flow of the entire scale control will be described. FIG. 12 is a diagram illustrating a flow of the scale control. An information processing system 1 includes clients 2, a load balancer 3, a service supply instance group 4, a response time information acquisition unit 5, a response time information database (DB) 6, an instance information DB 7, instances A and B, and a cloud environment application programming interface (API) 8.

The instance A includes a number-of-instances calculation unit 21 and a scale control unit 22. The instance B includes an instance information acquisition unit 23. The number-of-instances calculation unit 21, the scale control unit 22, and the instance information acquisition unit 23 may be included in one instance.

Here, the number-of-instances calculation unit 21, the scale control unit 22, and the instance information acquisition unit 23 are included in the functions of the control unit 12 in FIG. 1. The response time information acquisition unit 5 is included in the function of the monitoring unit 11 in FIG. 1. The response time information DB 6 and the instance information DB 7 are included in the functions of the storage unit 13 in FIG. 1.

[S1] The load balancer 3 receives a service request transmitted from the client 2.

[S2] The load balancer 3 selects an instance that supplies a corresponding service in response to the service request from the service supply instance group 4 including a plurality of instances. In this case, the instance is selected so that a load is not biased to specific instances.

[S3] The instance selected by the load balancer 3 performs a process by the service request and transmits a response to the client having transmitted the service request.

[S4] The response time information acquisition unit 5 acquires response time information indicating how much time the instance uses and transmits the response.

[S5] The response time information acquisition unit 5 stores the response time information in the response time information DB 6.

[S6] The instance information acquisition unit 23 acquires instance information regarding the instances under the cloud environment via the cloud environment management API 8.

[S7] The instance information DB 7 stores the instance information.

[S8] The number-of-instances calculation unit 21 calculates the number of instances to be subjected to the scale control based on the response time information and the instance information.

[S9] The scale control unit 22 performs the scale control based on a calculation result of the number of instances through the cloud environment management API 8.

Figure 13:
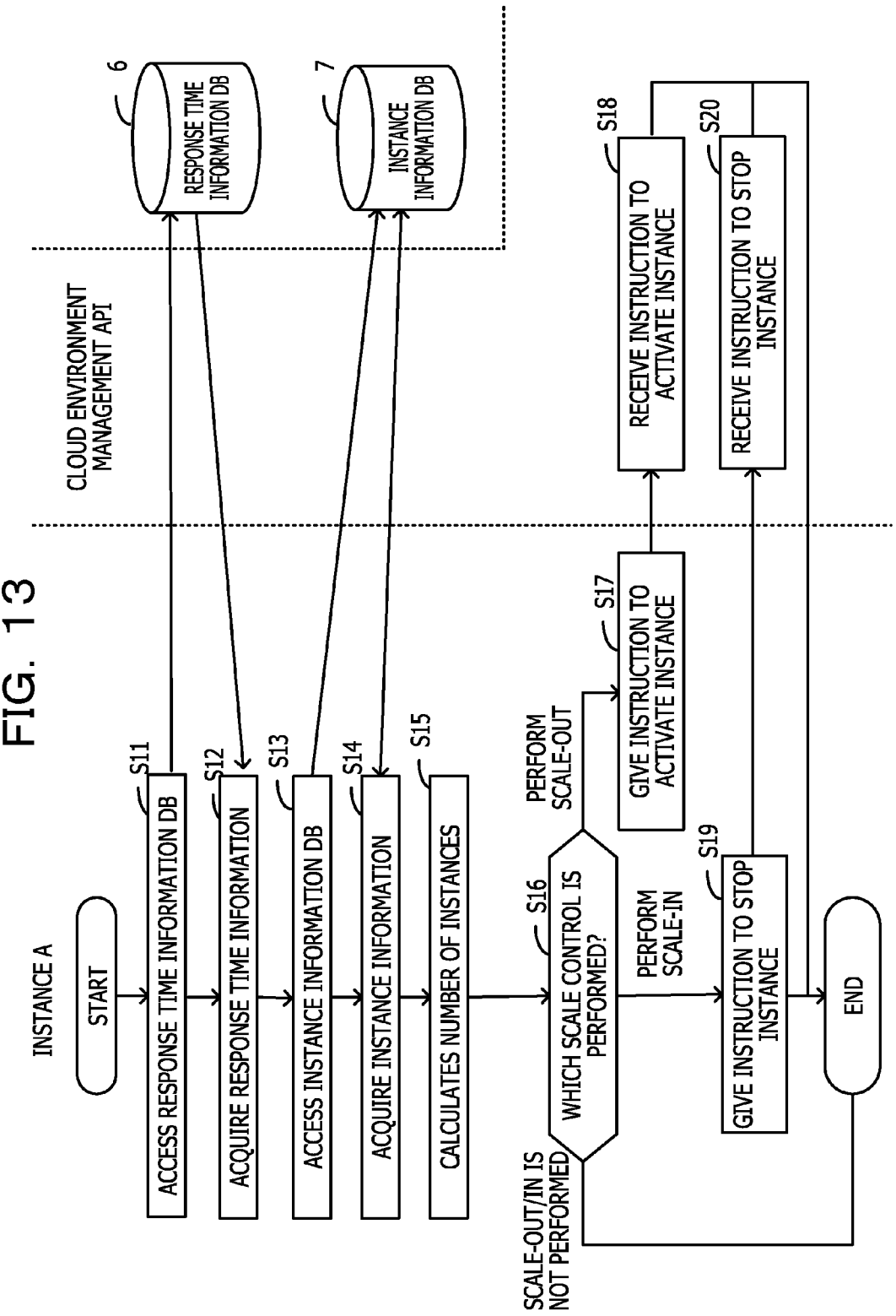
FIG. 13 is a flowchart illustrating an operation of the scale control.

Next, the scale control will be described with reference to a flowchart. FIG. 13 is a flowchart illustrating an operation of the scale control.

[S11] The number-of-instances calculation unit 21 accesses the response time information DB 6.

[S12] The number-of-instances calculation unit 21 acquires the response time information.

[S13] The number-of-instances calculation unit 21 accesses the instance information DB 7.

[S14] The number-of-instances calculation unit 21 acquires the instance information.

[S15] The number-of-instances calculation unit 21 calculates the number of instances.

[S16] The scale control unit 22 ends the scale control when the scale control unit 22 does not perform the scale-out/in. When the scale-out is performed, the process proceeds to step S17. When the scale-in is performed, the process proceeds to step S19.

[S17] The scale control unit 22 transmits an instruction to activate the scale-out target instance to the cloud environment management API 8.

[S18] The cloud environment management API 8 receives the instruction to activate the instance. The activation instruction transmitted from the scale control unit 22 is transmitted to the scale-out target instance via the cloud environment management API 8.

[S19] The scale control unit 22 transmits an instruction to stop the scale-in target instance to the cloud environment management API 8. As described above, when the instance under the activation process is present, the stopping instruction is given to the instance of which the activation start time is the latest and which is recently activated. When the instance under the activation process is not present, the stopping instruction is given to the instance of which the activation start time is the latest and which is recently activated.

[S20] The cloud environment management API 8 receives the instruction to stop the instance. The stopping instruction transmitted from the scale control unit 22 is transmitted to the scale-in target instance via the cloud environment management API 8.

Figure 14:
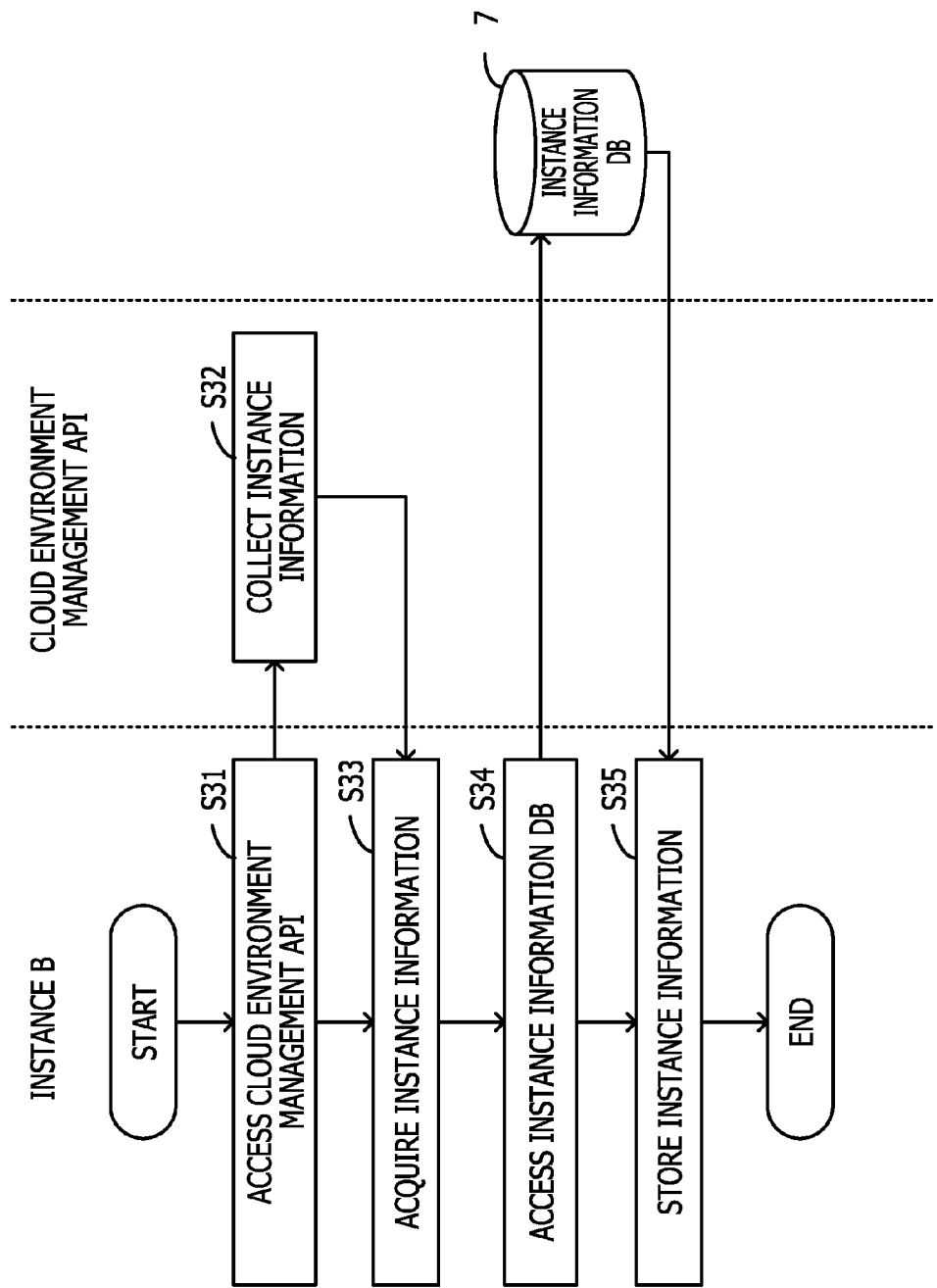
FIG. 14 is a flowchart illustrating an operation of acquiring instance information.

FIG. 14 is a flowchart illustrating an operation of acquiring instance information.

[S31] The instance information acquisition unit 23 accesses the cloud environment management API 8.

[S32] The cloud environment management API 8 collects the instance information from the instances under the cloud environment.

[S33] The instance information acquisition unit 23 acquires the instance information.

[S34] The instance information acquisition unit 23 accesses the instance information DB 7.

[S35] The instance information acquisition unit 23 stores the instance information in the instance information DB 7.

Next, data structures of the response time information DB 6 and the instance information DB 7 will be described. FIG. 15 is a diagram illustrating the data structure of the response time information DB. The response time information DB6 has a response time information table Tb. The response time information table Tb has items, an "instance ID", a "response time measurement starting date", a "response time measurement ending date", and an "average response time".

The "instance ID" is an identification number of an instance. The "response time measurement starting date" indicates a date in which measurement of a response time starts. The "response time measurement ending date" indicates a date in which the measurement of the response time ends. The "average response time" indicates a value obtained by dividing a total number of average response times of accesses from the start to the end of the measurement by the number of accesses.

Figure 16:
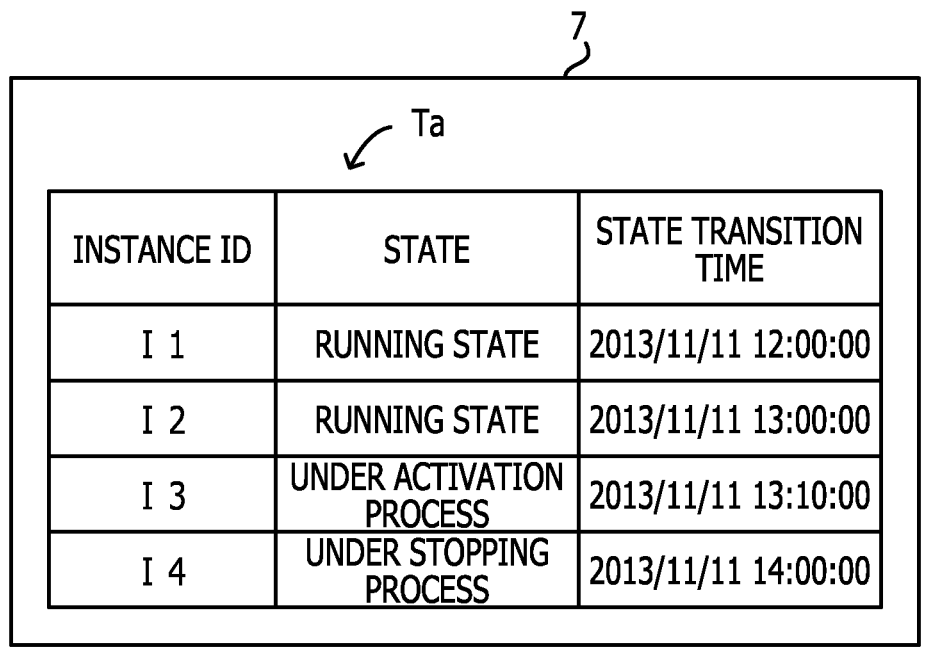
FIG. 16 is a diagram illustrating an example of the data structure of instance information DB.

FIG. 16 is a diagram illustrating an example of the data structure of the instance information DB. The instance information DB has the instance information table Ta. Since the instance information table Ta has been described above with reference to FIG. 5, the description thereof will be omitted.

Next a number-of-instances calculation process will be described. FIGS. 17 and 18 are diagrams for describing the number-of-instances calculation process. In FIG. 17, the horizontal axis represents a system running time, the left vertical axis represents a response time (ms), and the right vertical axis represents the number of instances.

Here, a target response time which is a target value of the response time is assumed to be 200 ms. Further, a calculation expression for the number of instances is defined as follows:

number of instances (unit number)={(actual measurement response time at time $T_N$–target response time)·K1}+{(actual measurement response time at time $T_N$–actual measurement response time at time $T_{(N-1)}$)·K2} (1)

In Expression (1), K1 and K2 are coefficients. Here, "K1=1/100" and "K2=1/400" are set. The number of instances rounds off. When the number of instances is a positive number, the scale-out is performed. When the number of instances is a negative number, the scale-in is performed.

On the other hand, {(actual measurement response time at time $T_N$–target response time)·K1} of Expression (1) is a term (referred to as term #1) for calculating the number of scales based on a difference between an actual measurement value and a target value of the response time.

Further, {(actual measurement response time at time $T_N$–actual measurement response time at time $T_{(N-1)}$)·K2} of Expression (1) is a term (referred to as term #2) for calculating the number of scales based on a change in the actual measurement value of the response time. Hereinafter, an operation at times T0 to T3 illustrated in FIG. 17 will be described.

[T0] The actual measurement response time is equal to 200 ms and the number of running instances is equal to 1. The actual measurement response time is equal to the target response time (the scale-out/in is not performed).

[T1] The actual measurement response time is equal to 600 ms and the number of running instances is equal to 1. The actual measurement response time exceeds the target response time. In this case, at the time T1, the actual measurement response time is equal to 600 ms and the target response time is equal to 200 ms. At the previous time T0, the actual measurement response time is equal to 200 ms.

Accordingly, term #1 of Expression (1) is "(600–200)/100=4". Further, term #2 of Expression (1) is "(600–200)/400=1". Accordingly, the number of instances is equal to "4+1=5" and it is determined that 5 instances are subjected to the scale-out.

[T2] The actual measurement response time is equal to 300 ms and the number of running instances is equal to 6. The actual measurement response time exceeds the target response time. In this case, at the time T2, the actual measurement response time is equal to 300 ms and the target response time is equal to 200 ms. At the previous time T1, the actual measurement response time is equal to 600 ms.

Accordingly, term #1 of Expression (1) is "(300–200)/100=1". Further, term #2 of Expression (1) is "(300–600)/400=–0.75". Accordingly, the number of instances is equal to "1+(–0.75)=0.25", but rounds off to become 0. Therefore, at the time T2, the scale control is not performed.

[T3] The actual measurement response time is equal to 100 ms and the number of running instances is equal to 6. The actual measurement response time is less than the target response time. In this case, at the time T3, the actual measurement response time is equal to 100 ms and the target response time is equal to 200 ms. At the previous time T2, the actual measurement response time is equal to 300 ms.

Accordingly, term #1 of Expression (1) is "(100–200)/100=–1". Further, term #2 of Expression (1) is "(100–300)/400=–0.5". Accordingly, the number of instances is equal to "(–1)+(–0.5)=–1.5" and rounds off. Thus, 2 instances are subjected to the scale-in.

Thus, by calculating the number of instances using Expression (1), it is possible to efficiently obtain the number of instances to be subjected to the scale-out/in. As a result, a period in which the instance is deficient or excessive is shortened, and thus operational efficiency of the system is improved.

A user using a service by cloud computing is charged according to the number of running instances in some cases. In this case, when the period in which the instance is deficient or excessive is shortened, excessive charging to the user is suppressed. When a running instance is determined not to be desired before activation completion, the instance is stopped. Therefore, when deficiency in performance can be predicted, an instance can start to be activated before actual occurrence of the deficiency in performance. When the deficiency in performance is known not to occur, the activation process can be stopped. As a result, since there is no reason for delaying the start of the activation of an instance in order to suppress charging, occurrence of shortage of an instance due to delay of the start of the activation of the instance is suppressed.

Figure 19:
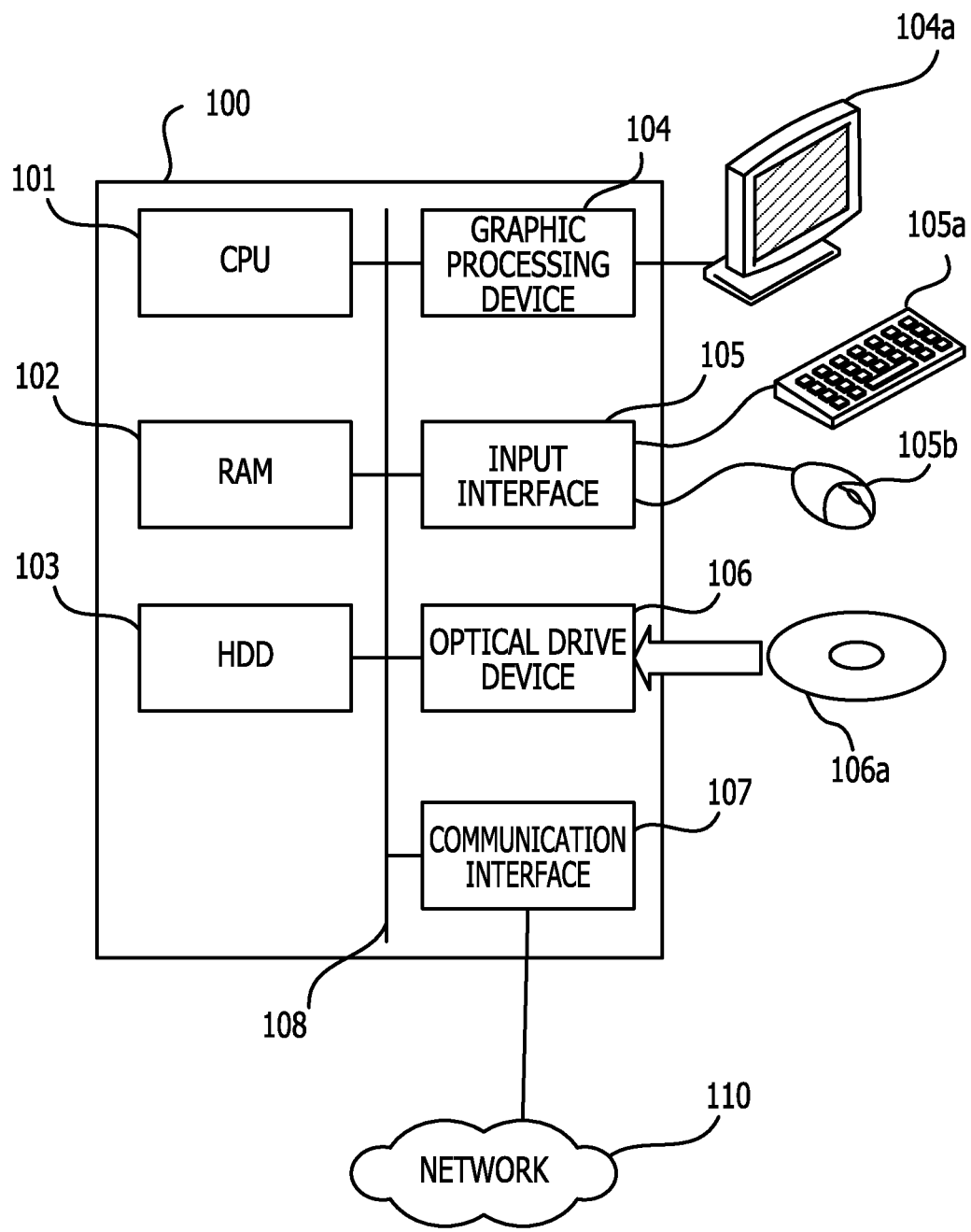
FIG. 19 is a diagram illustrating a hardware example of a computer used in the information processing apparatus.

Next, a case in which the present technology is realized by a computer will be described. The above-described processing functions can be realized by a computer. For example, the information processing system 1 is configured to include one or more computers. The functions of the number-of-instances calculation unit 21 and the scale control unit 22 can be realized by one computer included in the information processing system 1. FIG. 19 is a diagram illustrating a hardware example of a computer used in the information processing apparatus.

The entire device, the computer 100, in the information processing apparatus 10 is controlled by a CPU 101. A random access memory (RAM) 102 and a plurality of peripheral devices are connected to the CPU 101 via a bus 108.

The RAM 102 is used as a main storage device of the computer 100. At least a part of a program of an operating system (OS) or an application program executed by the CPU 101 is temporarily stored in the RAM 102. Various kinds of data used in a process by the CPU 101 are stored in the RAM 102.

As the peripheral devices connected to the bus 108, there are a hard disk drive (HDD) 103, a graphic processing device 104, an input interface 105, an optical drive device 106, a communication interface 107, and the like.

The HDD 103 magnetically writes and reads data on and from a built-in disk. The HDD 103 is used as a secondary storage device of the computer 100. The HDD 103 stores the program of the OS, the application program, and various kinds of data. A semiconductor storage device such as a flash memory can also be used as the secondary storage device.

A monitor 104a is connected to the graphic processing device 104. The graphic processing device 104 displays an image on the screen of the monitor 104a according to a command from the CPU 101. As the monitor 104a, there is a display device using a cathode ray tube (CRT), a liquid crystal display device, or the like.

A keyboard 105a and a mouse 105b are connected to the input interface 105. The input interface 105 transmits a signal transmitted from the keyboard 105a or the mouse 105b to the CPU 101. The mouse 105b is an example of a pointing device and other pointing devices can also be used. As the other pointing devices, there are a touch panel, a tablet, a touch pad, a track ball, and the like.

The optical drive device 106 reads data recorded on an optical disc 106a using a laser beam or the like. The optical disc 106a is a portable recording medium on which data readable by light reflection is recorded. As the optical disc 106a, there is a digital versatile disc (DVD), a DVD-RAM, a Compact Disc Read Only Memory (CD-ROM), a CD-R (Recordable)/RW (Rewritable), or the like.

The communication interface 107 is connected to a network 110. The communication interface 107 transmits and receives data to and from another computer or a communication device via the network 110.

The functions of the information processing apparatus 10 can be realized by the above-described hardware configuration. When the functions of the embodiment are realized by a computer, a program describing the processing contents of the functions of the information processing apparatus 10 is provided.

By causing the computer to execute the program, the foregoing processing functions are realized on the computer. The program describing the processing contents can be recorded on a computer-readable recording medium.

As the computer-readable recording medium, there is a magnetic storage device, an optical disc, a magneto-optical disc, a semiconductor memory, or the like. As the magnetic storage device, there is a hard disk device (HDD), a flexible disc (FD), a magnetic tape, or the like. As the optical disc, there is a DVD, a DVD-RAM, a CD-ROM/RW, or the like. As the magneto-optical medium, there is a magneto-optical disc (MO) or the like. The recording medium recording a program does not include a temporarily transmitted signal itself.

When a program is circulated, for example, a portable recording medium such as a DVD or a CD-ROM on which the program is recorded is sold. Further, a program can be stored in a storage device of a server computer and the program can also be transmitted from the server computer to another computer via a network.

For example, a computer executing a program stores a program recorded on a portable recording medium or a program transmitted from a server computer in a storage device of the computer. Then, the computer reads the program from the storage device of the computer and executes a process according to the program. The computer can also read the program directly from the portable recording medium and execute a process according to the program. Whenever a program is transmitted from the server computer, the computer can also execute a process according to the received program in order.

At least some of the foregoing processing functions can also be realized by an electronic circuit such as a digital signal processor (DSP), an application specific integrated circuit (ASIC), or a programmable logic device (PLD).

The embodiment has been exemplified above, but the configuration of each unit described in the embodiment can be substituted with another configuration with the same function. Further, other optional constituents or processes may be added.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A method comprising:
monitoring, by a processor, while an additional virtual machine is under an activation process to be launched on a management target system on which a plurality of virtual machines are executing, a load of hardware resources used by the plurality of executed virtual machines on the management target system;
cancelling, by the processor, the activation process to launch the additional virtual machine, in response to the monitoring detecting a decrease of the load of hardware resources of the management target system; and
issuing, by the processor, to the management target system an instruction to stop an additional virtual machine, among other additional virtual machines, under the activation process for which an activation start time is more recent than the other additional virtual machines under the activation process, in response to an instruction to decrease a resource of the management target system.

2. The method of claim 1, further comprising:
issuing, by the processor, in response to the instruction to decrease the resource of the management target system, an instruction to the management target system to stop one of the plurality of virtual machines which is executing in the management target system when the additional virtual machine under the activation process in the management target system is not present.

3. The method of claim 1, further comprising:
issuing, by the processor, an instruction to the management target system to perform a scale-out of a virtual machine among the executing virtual machines, in response to a rate of change of a load increase exceeding a first threshold value; and
issuing, by the processor, an instruction to the management target system to perform a scale-in of a virtual machine among the executing virtual machines, in response to a rate of change of a load decrease exceeding a second threshold value.

4. The method of claim 3, further comprising:
in response to the issuing the instruction of the scale-out or the scale-in,
calculating, by the processor, a sum of a first difference value obtained by multiplying a difference between a current actual measurement load and a target load by a first coefficient and a second difference value obtained by multiplying a difference between the current actual measurement load and an actual measurement load before a predetermined time by a second coefficient; and
setting, by the processor, a value of a positive number as a number of virtual machines among the executing virtual machines to be subjected to the scale-out when the calculated sum is the positive number and setting a value of a negative number as a number of virtual machine among the executing virtual machines to be subjected to the scale-in when the calculated sum is the negative number.

5. An apparatus comprising:
a memory; and
a processor coupled to the memory and configured to execute a process comprising:
monitoring while an additional virtual machine is under an activation process to be launched on a management target system on which a plurality of virtual machines are executing, a load of hardware resources used by the plurality of executed virtual machines on the management target system;
cancelling the activation process to launch the additional virtual machine, in response to the monitoring detecting a decrease of the load of hardware resources of the management target system; and
issuing to the management target system an instruction to stop an additional virtual machine, among other additional virtual machines, under the activation process for which an activation start time is more recent than the other additional virtual machines under the activation process, in response to an instruction to decrease a resource of the management target system.

6. The apparatus according to claim 5, wherein the process further comprising:
issuing, in response to the instruction to decrease the resource of the management target system, an instruction to the management target system to stop one of the plurality of virtual machines which is executing in the management target system when the additional virtual machine under the activation process in the management target system is not present.

7. The apparatus according to claim 5, wherein the process further comprising:
issuing an instruction to the management target system to perform a scale-out of a virtual machine, among the executing virtual machines, in response to a rate of change of a load increase exceeding a first threshold value; and
issuing an instruction to the management target system to perform a scale-in of a virtual machine among the executing virtual machines, in response to a rate of change of load decrease exceeding a second threshold value.

8. The apparatus according to claim 7, wherein the process further comprising:
in response to the issuing the instruction of the scale-out or the scale-in,
calculating a sum of a first difference value obtained by multiplying a difference between a current actual measurement load and a target load by a first coefficient and a second difference value obtained by multiplying a difference between the current actual measurement load and an actual measurement load before a predetermined time by a second coefficient; and
setting a value of a positive number as a number of virtual machines among the executing virtual machines to be subjected to the scale-out when the calculated sum is the positive number and setting a value of a negative number as a number of virtual machine among the executing virtual machines to be subjected to the scale-in when the calculated sum is the negative number.

9. A non-transitory computer-readable medium storing therein a program that causes the computer to execute a process, the process comprising:
monitoring while an additional virtual machine is under an activation process to be launched on a management target system on which a plurality of virtual machines are executing, a load of hardware resources used by the plurality of executed virtual machines on the management target system;
cancelling the activation process to launch the additional virtual machine, in response to the monitoring detecting a decrease of the load of hardware resources of the management target system; and
issuing to the management target system an instruction to stop an additional virtual machine, among other additional virtual machines, under the activation process for which an activation start time is more recent than the other additional virtual machines under the activation process, in response to an instruction to decrease a resource of the management target system.

10. The non-transitory computer-readable medium according to claim 9, wherein the process further comprising:
issuing, in response to the instruction to decrease the resource of the management target system, an instruction to the management target system to stop one of the plurality of virtual machines which is executing in the management target system when the additional virtual machine under the activation process in the management target system is not present.

11. The non-transitory computer-readable medium according to claim 9, wherein the process further comprising:
issuing an instruction to the management target system to perform a scale-out of a virtual machine, among the executing virtual machines, in response to a rate of change of a load increase exceeding a first threshold value; and
issuing an instruction to the management target system to perform a scale-in of a virtual machine among the executing virtual machines, in response to a rate of change of load decrease exceeding a second threshold value.

12. The non-transitory computer-readable medium according to claim 11, wherein the process further comprising:
in response to the issuing the instruction of the scale-out or the scale-in,
calculating a sum of a first difference value obtained by multiplying a difference between a current actual measurement load and a target load by a first coefficient and a second difference value obtained by multiplying a difference between the current actual measurement load and an actual measurement load before a predetermined time by a second coefficient; and
setting a value of a positive number as a number of virtual machines among the executing virtual machines to be subjected to the scale-out when the calculated sum is the positive number and setting a value of a negative number as a number of virtual machine among the executing virtual machines to be subjected to the scale-in when the calculated sum is the negative number.

* * * * *